(12) United States Patent
Beste et al.

(10) Patent No.: US 7,485,208 B2
(45) Date of Patent: *Feb. 3, 2009

(54) RECYCLING OF IONIC LIQUIDS PRODUCED IN EXTRACTIVE DISTILLATION

(75) Inventors: York Alexander Beste, Mannheim (DE); Hartmut Schoenmakers, Dossenheim (DE); Wolfgang Arlt, Hohen Neuendorf (DE); Matthias Seiler, Griesheim (DE); Carsten Jork, Berlin (DE)

(73) Assignee: BASF Aktiengesellschart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/566,931

(22) PCT Filed: Jul. 15, 2004

(86) PCT No.: PCT/EP2004/007868

§ 371 (c)(1),
(2), (4) Date: Aug. 7, 2006

(87) PCT Pub. No.: WO2005/016484

PCT Pub. Date: Feb. 24, 2005

(65) Prior Publication Data

US 2006/0272934 A1    Dec. 7, 2006

(30) Foreign Application Priority Data

Aug. 5, 2003 (DE) .................. 103 36 555

(51) Int. Cl.
*B01D 3/40* (2006.01)
*B01D 3/06* (2006.01)

(52) U.S. Cl. .............................. 203/49; 203/50; 203/99; 203/DIG. 19

(58) Field of Classification Search ................ 159/47.1, 159/DIG. 20; 203/2, 3, 24, 25, 27, 49, 50, 203/78–80, 99, DIG. 19
See application file for complete search history.

(56) References Cited

U.S. PATENT DOCUMENTS

| 4,623,432 A | * | 11/1986 | Ali ................. 203/98 |
| 5,475,128 A | * | 12/1995 | Roscher et al. ............. 558/142 |
| 2002/0063240 A1 | | 5/2002 | Munson et al. |
| 2003/0125599 A1 | | 7/2003 | Boudreau et al. |
| 2004/0133058 A1 | * | 7/2004 | Arlt et al. ................. 585/833 |
| 2005/0090704 A1 | * | 4/2005 | Roettger et al. ............. 585/860 |
| 2007/0080052 A1 | * | 4/2007 | Beste et al. .................. 203/50 |

FOREIGN PATENT DOCUMENTS

| WO | WO-02/074718 | 9/2002 |
| WO | WO-03/040264 | 5/2003 |

* cited by examiner

*Primary Examiner*—Virginia Manoharan (57) ABSTRACT

Process for working up a bottom stream wherein high boilers and ionic liquid from an extractive rectification in which the ionic liquid is used as entrainer. The process includes feeding the bottom stream to an evaporation stage which is operated at a pressure of less than 500 mbar or to a stripper which is operated through use of inert gas or steam, and the major part of the high boiler present is separated off in vapor form from the ionic liquid.

11 Claims, 5 Drawing Sheets

RECYCLING OF IONIC LIQUIDS PRODUCED IN EXTRACTIVE DISTILLATION

RELATED APPLICATIONS

This application is a national stage application (under 35 U.S.C. 371) of PCT/EP2004/007868 filed Jul. 15, 2004 which claims benefit to German application 103 36 555.9 filed Aug. 5, 2003.

The present invention relates to an improved process for working up a bottom stream comprising high boilers and ionic liquids (ILs) from an extractive rectification.

Many liquid mixtures which cannot be separated by conventional rectification and are preferably separated by extractive rectification [Stichimair, S. and Fair, J., Distillation, ISBN 0-471-25241-7, page 241 ff] occur in industry. This is due to the similar boiling behavior of the components of the mixture, i.e. the fact that at a defined pressure and a defined temperature they are distributed in virtually the same or the same molar concentration ratio over the vapor phase and liquid phase.

In the case of a binary liquid mixture consisting of the components i and j, the difficulty of the separation task in rectification is indicated by the separation factor $\alpha_{ij}$, viz. the ratio of the partition coefficients of the components i and j. The closer the separation factor is to one, the more costly the separation of the components of the mixture by means of conventional rectification, since either the number of theoretical plates in the rectification column and/or the reflux ratio at the top of the column has/have to be increased. If the separation factor is one, an azeotropic mixture is present and further concentration of the components of the mixture is no longer possible even when the number of theoretical plates or the reflux ratio is increased. In general, it has to be noted that the separation factor can be greater than or smaller than 1, depending on whether the partition coefficient of the low boiler is in the numerator or the denominator. Normally, the low boiler is entered in the numerator, so that the separation factor is greater than 1.

A procedure which is frequently practiced in industry for the separation of close-boiling systems, viz. systems having a separation factor of smaller than about 1.2, or azeotropic systems is addition of a selective additive, known as an entrainer, in an extractive rectification. A suitable additive interacts selectively with one or more of the components of the mixture and thus influences the separation factor so that separation of the close-boiling or azeotropically boiling components of the mixture is made possible. The overhead component is the component which has a lower boiling point in the presence of the entrainer, and the components which have a higher boiling point in the presence of the entrainer are present in the bottoms.

A measure of the intensity of the interactions of the entrainer with one or more of the components of the mixture is the selectivity. The selectivity is defined as the ratio of the interfacial activity coefficient of the component i to the interfacial activity coefficient of the component j, with the components i and j being present in infinite dilution in the entrainer [Schult, C. J. et. al.; Infinite-dilution activity coefficients for several solutes in hexadecane and in n-methyl-2-pyrrolidone (NMP): experimental measurements and UNIFAC predictions; Fluid Phase Equilibria 179 (2001) pp. 117-129]. As indicated by Schult et. al., a higher entrainer selectivity leads to a higher relative volatility, a smaller reflux ratio and thus to lower separation costs. As disclosed below, a very high selectivity of, for example, greater than 1.3, preferably greater than 2.0, is desirable.

WO 02/074718 discloses that ionic liquids (ILs) are particularly good entrainers for the separation of close-boiling or azeotropic liquid mixtures and are superior to conventional entrainers. The superiority can be seen directly in the selectivity and separation factor. When using a suitable ionic liquid, the separation factor at the azeotropic point is further from one than when using a conventional additive in the same amount.

For the purposes of the present invention, ionic liquids are as defined by Wasserscheid and Keim in Angewandte Chemie 2000, 112, 3926-3945. The class of ionic liquids represents a new type of solvent. As indicated in the publication mentioned, ionic liquids are salts which melt at relatively low temperatures and have a nonmolecular, ionic character. They are liquid at relatively low temperatures and have a relatively low viscosity. They have very good solvent capabilities for a large number of organic, inorganic and polymeric substances.

DETAILED DESCRIPTION

Compared to ionic salts, ionic liquids are liquid at significantly lower temperatures (in general below 200° C.) and frequently have a melting point below 0° C., in one case down to −96° C., which is important for the industrial implementation of extractive rectification.

In addition, ionic liquids are generally nonflammable, noncorrosive and have a low viscosity and also display an imperceptible vapor pressure. For the purposes of the present invention, ionic liquids are compounds which have at least one positive charge and at least one negative charge but are overall electrically neutral and have a melting point below 200° C., preferably below 100° C., particularly preferably at ambient temperature.

The ionic liquids can also have a plurality of positive or negative charges, for example from 1 to 5, preferably from 1 to 4, particularly preferably from 1 to 3, very particularly preferably 1 or 2, but in particular one positive charge and one negative charge.

The charges can be located in various localized or delocalized regions within a molecule, i.e. in a betaine-like fashion, or be distributed over separate anions and cations. Preference is given to ionic liquids which are made up of at least one cation and at least one anion. Cation and anion can, as indicated above, bear one or more charges, preferably a single charge.

Of course, mixtures of various ionic liquids or mixtures of conventional entrainers such as N-methylpyrrolidone, dimethylformamide, ethanediol, benzene, cyclohexane, water, etc., with ionic liquids are also conceivable.

Preferred cations are ammonium or phosphonium ions or cations containing at least one five- or six-membered hetero- cycle which has at least one phosphorus or nitrogen atom and, if desired, an oxygen or sulfur atom, particularly preferably compounds which contain at least one five- or six-membered heterocycle having one, two or three nitrogen atoms and one sulfur or oxygen atom, very particularly preferably compounds having one or two nitrogen atoms.

Particularly preferred ionic liquids are those having a molecular weight of less than 1000 g/mol, very particularly preferably less than 350 g/mol.

Furthermore, preference is given to cations selected from among the compounds of the formulae (Ia) to (Iw),

(a)

(b)

(c)

(d)

(e)

(f)

(g)

-continued

(h)

(i)

(j)

(k)

(l)

(m)

(n)

(o)

(p)

(q)

and also oligomers and polymers comprising these structures, where $R^1$, $R^2$, $R^3$, $R^4$, $R^5$, $R^6$ and $R^7$ are each, independently of one another, $C_1$-$C_{18}$-alkyl, $C_2$-$C_{18}$-alkyl which may be interrupted by one or more oxygen and/or sulfur atoms and/or one or more substituted or unsubstituted imino groups, $C_6$-$C_{12}$-aryl, $C_5$-$C_{12}$-cycloalkyl or a five- or six-membered, oxygen-, nitrogen- and/or sulfur-containing heterocycle or two of them together form an unsaturated, saturated or aromatic ring which may be interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

In addition, $R^1$, $R^2$, $R^3$, $R^4$, $R^5$ and $R^6$ can also be hydrogen.

$R^7$ can also be $C_1$-$C_{18}$-alkyloyl (alkylcarbonyl), $C_1$-$C_{18}$-alkyloxycarbonyl, $C_6$-$C_{12}$-cyclo-alkylcarbonyl or $C_6$-$C_{12}$-aryloyl (arylcarbonyl), where the radicals mentioned may each be substituted by functional groups, aryl, alkyl, aryloxy, alkyloxy, halogen, heteroatoms and/or heterocycles.

In these formulae, $C_1$-$C_{18}$-alkyl which may be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethyl-propyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)-ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxy-isopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-amino-hexyl, 2-methylaminoethyl, 2-methylaminopropyl, 3-methylaminopropyl, 4-methyl-aminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, and $C_2$-$C_{18}$-alky which may be interrupted by one or more oxygen and/or sulfur atoms and/or one or more substituted or unsubstituted imino groups is, for example, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, these radicals together can be 1,3-propylene, 1,4-butylene, 2-oxa-1,3-propylene, 1-oxa-1,3-propylene, 2-oxa-1,3-propylene, 1-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of oxygen and/or sulfur atoms and/or imino groups is not subject to any restrictions. In general, there are not more than 5 such atoms or groups in the radical, preferably not more than 4 and very particularly preferably not more than 3.

Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

Furthermore, functional groups are carboxyl, carboxamide, hydroxyl, di($C_1$-$C_4$-alkyl)amino, $C_1$-$C_4$-alkyloxycarbonyl, cyano or $C_1$-$C_4$-alkyloxy, $C_6$-$C_{12}$-aryl which may be substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-di-methoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which may be substituted by functional groups, aryl, alkyl, aryloxy, alkyloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, a five- or six-membered, oxygen-, nitrogen- and/or sulfur-containing heterocycle is, for example, furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl, difluoropyridyl, methylthienyl, isopropylthienyl or tert-butylthienyl and $C_1$-$C_4$-alkyl is, for example, methyl, ethyl, propyl, isopropyl, n-butyl, sec-butyl or tert-butyl.

$C_1$-$C_{18}$-Alkyloyl (alkylcarbonyl) can be, for example, acetyl, propionyl, n-butyloyl, sec-butyloyl, tert-butyloyl, 2-ethylhexylcarbonyl, decanoyl, dodecanoyl, chloroacetyl, trichloroacetyl or trifluoroacetyl.

$C_1$-$C_{18}$-Alkyloxycarbonyl can be, for example, methyloxycarbonyl, ethyloxycarbonyl, propyloxycarbonyl, isopropyloxycarbonyl, n-butyloxycarbonyl, sec-butyloxycarbonyl, tert-butyloxycarbonyl, hexyloxycarbonyl, 2-ethylhexyloxycarbonyl or benzyloxycarbonyl.

$C_5$-$C_{12}$-Cycloalkylcarbonyl can be, for example, cyclopentylcarbonyl, cyclohexylcarbonyl or cyclododecylcarbonyl.

$C_6$-$C_{12}$-Aryloyl (arylcarbonyl) can be, for example, benzoyl, toluyl, xyloyl, α-naphthoyl, β-naphthoyl, chlorobenzoyl, dichlorobenzoyl, trichlorobenzoyl or trimethylbenzoyl.

Preference is given to $R^1$, $R^2$, $R^3$, $R^4$, $R^5$ and $R^6$ each being, independently of one another, hydrogen, methyl, ethyl, n-butyl, 2-hydroxyethyl, 2-cyanoethyl, 2-(methoxycarbonyl)ethyl, 2-(ethoxycarbonyl)ethyl, 2-(n-butoxycarbonyl)ethyl, dimethylamino, diethylamino or chlorine.

$R^7$ is preferably methyl, ethyl, n-butyl, 2-hydroxyethyl, 2-cyanoethyl, 2-(methoxy-carbonyl)ethyl, 2-(ethoxycarbonyl)ethyl, 2-(n-butoxycarbonyl)ethyl, acetyl, propionyl, t-butyryl, methoxycarbonyl, ethoxycarbonyl or n-butoxycarbonyl.

Particularly preferred pyridinium ions (Ia) are those in which one of the radicals $R^1$ to $R^5$ is methyl, ethyl or chlorine, $R^7$ is acetyl, methyl, ethyl or n-butyl and all others are hydrogen, or $R^3$ is dimethylamino, $R^7$ is acetyl, methyl, ethyl or n-butyl and all others are hydrogen or $R^7$ is acetyl, methyl, ethyl or n-butyl and all others are hydrogen or $R^2$ is carboxyl or carboxamide, $R^7$ is acetyl, methyl, ethyl or n-butyl and all others are hydrogen or $R^1$ and $R^2$ or $R^2$ and $R^3$ together form 1,4-buta-1,3-dienylene, $R^7$ is acetyl, methyl, ethyl or n-butyl and all others are hydrogen.

Particularly preferred pyridazinium ions (Ib) are those in which one of the radicals $R^1$ to $R^4$ is methyl or ethyl, $R^7$ is acetyl, methyl, ethyl or n-butyl and all others are hydrogen or $R^7$ is acetyl, methyl, ethyl or n-butyl and all others are hydrogen.

Particularly preferred pyrimidinium ions (Ic) are those in which $R^2$ to $R^4$ are each hydrogen or methyl, $R^7$ is acetyl, methyl, ethyl or n-butyl and $R^1$ is hydrogen, methyl or ethyl, or $R^2$ and $R^4$ are each methyl, $R^3$ is hydrogen and $R^1$ is hydrogen, methyl or ethyl and $R^7$ is acetyl, methyl, ethyl or n-butyl.

Particularly preferred pyrazinium ions (Id) are those in which $R^1$ to $R^4$ are all methyl and $R^7$ is acetyl, methyl, ethyl or n-butyl or $R^7$ is acetyl, methyl, ethyl or n-butyl and all others are hydrogen.

Particularly preferred imidazolium ions (Ie) are those in which, independently of one another, $R^1$ is selected from among methyl, ethyl, n-propyl, n-butyl, n-pentyl, n-octyl, n-decyl, n-dodecyl, 2-hydroxyethyl and 2-cyanoethyl, $R^7$ is acetyl, methyl, ethyl or n-butyl and $R^2$ to $R^4$ are each, independently of one another, hydrogen, methyl or ethyl.

Particularly preferred 1H-pyrazolium ions (If) are those in which, independently of one another $R^1$ is selected from among hydrogen, methyl and ethyl, $R^2$, $R^3$ and $R^4$ are selected from among hydrogen and methyl and $R^7$ is selected from among acetyl, methyl, ethyl and n-butyl.

Particularly preferred 3H-pyrazolium ions (Ig) are those in which, independently of one another, $R^1$ is selected from among hydrogen, methyl and ethyl, $R^2$, $R^3$ and $R^4$ are selected from among hydrogen and methyl and $R^7$ is selected from among acetyl, methyl, ethyl and n-butyl.

Particularly preferred 4H-pyrazolium ions (Ih) are those in which, independently of one another, $R^1$ to $R^4$ are selected from among hydrogen and methyl and $R^7$ is selected from among acetyl, methyl, ethyl and n-butyl.

Particularly preferred 1-pyrazolinium ions (Ii) are those in which, independently of one another, $R^1$ to $R^6$ are selected from among hydrogen and methyl and $R^7$ is selected from among acetyl, methyl, ethyl and n-butyl.

Particularly preferred 2-pyrazolinium ions (Ij) are those in which, independently of one another, $R^1$ is selected from among hydrogen, methyl, ethyl and phenyl, $R^7$ is selected from among acetyl, methyl, ethyl and n-butyl and $R^2$ to $R^6$ are selected from among hydrogen and methyl.

Particularly preferred 3-pyrazolinium ions (Ik) are those in which, independently of one another, $R^1$ and $R^2$ are selected from among hydrogen, methyl, ethyl and phenyl, $R^7$ is selected from among acetyl, methyl, ethyl and n-butyl and $R^3$ to $R^6$ are selected from among hydrogen and methyl.

Particularly preferred imidazolinium ions (Il) are those in which, independently of one another,
$R^1$ and $R^2$ are selected from among hydrogen, methyl, ethyl, n-butyl and phenyl,
$R^7$ is selected from among acetyl, methyl, ethyl and n-butyl and
$R^3$ and $R^4$ are selected from among hydrogen, methyl and ethyl and
$R^5$ and $R^6$ are selected from among hydrogen and methyl.

Particularly preferred imidazolinium ions (Im) are those in which, independently of one another,
$R^1$ and $R^2$ are selected from among hydrogen, methyl and ethyl,
$R^7$ is selected from among acetyl, methyl, ethyl and n-butyl and
$R^3$ to $R^6$ are selected from among hydrogen and methyl.

Particularly preferred imidazolinium ions (In) are those in which, independently of one another,
$R^1$, $R^2$ and $R^3$ are selected from among hydrogen, methyl and ethyl,
$R^7$ is selected from among acetyl, methyl, ethyl and n-butyl and
$R^4$ to $R^6$ are selected from among hydrogen and methyl.

Particularly preferred thiazolium ions (Io) and oxazolium ions (Ip) are those in which, independently of one another,
$R^1$ is selected from among hydrogen, methyl, ethyl and phenyl,
$R^7$ is selected from among acetyl, methyl, ethyl and n-butyl and
$R^2$ and $R^3$ are selected from among hydrogen and methyl.

Particularly preferred 1,2,4-triazolium ions (Iq) and (Ir) are those in which, independently of one another,
$R^1$ and $R^2$ are selected from among hydrogen, methyl, ethyl and phenyl,
$R^7$ is selected from among acetyl, methyl, ethyl and n-butyl and
$R^3$ is selected from among hydrogen, methyl and phenyl.

Particularly preferred 1,2,3-triazolium ions (Is) and (It) are those in which, independently of one another,
$R^1$ is selected from among hydrogen, methyl and ethyl,
$R^7$ is selected from among acetyl, methyl, ethyl and n-butyl and
$R^2$ and $R^3$ are selected from among hydrogen and methyl or
$R^2$ and $R^3$ together form a 1,4-buta-1,3-dienylene group and all others are hydrogen.

Particularly preferred pyrrolidinium ions (Iu) are those in which, independently of one another,
$R^1$ and $R^7$ are selected from among acetyl, methyl, ethyl and n-butyl and
$R^2$, $R^3$, $R^4$ and $R^5$ are each hydrogen.

Particularly preferred ammonium ions (Iv) are those in which, independently of one another,
$R^7$ is selected from among acetyl, methyl, ethyl and n-butyl and
$R^1$, $R^2$ and $R^3$ are selected from among methyl, ethyl, n-butyl, 2-hydroxyethyl, benzyl and phenyl.

Particularly preferred phosphonium ions (Iw) are those in which, independently of one another,
$R^7$ is selected from among acetyl, methyl, ethyl and n-butyl and
$R^1$, $R^2$ and $R^3$ are selected from among phenyl, phenoxy, ethoxy and n-butoxy.

Among these, preference is given to the ammonium, phosphonium, pyridinium and imidazolium ions.

Very particularly preferred cations are 1,2-dimethylpyridinium, 1-methyl-2-ethyl-pyridinium, 1-methyl-2-ethyl-6-methylpyridinium, N-methylpyridinium, 1-butyl-2-methylpyridinium, 1-butyl-2-ethylpyridinium, 1-butyl-2-ethyl-6-methylpyridinium, N-butylpyridinium, 1-butyl-4-methylpyridinium, 1,3-dimethylimidazolium, 1,2,3-trimethylimidazolium, 1-n-butyl-3-methylimidazolium, 1,3,4,5-tetramethylimidazolium, 1,3,4-trimethylimidazolium, 2,3-dimethylimidazolium, 1-butyl-2,3-dimethylimidazolium, 3,4-dimethylimidazolium, 2-ethyl-3,4-dimethylimidazolium, 3-methyl-2-ethylimidazole, 3-butyl-1-methylimidazolium, 3-butyl-1-ethylimidazolium, 3-butyl-1,2-dimethylimidazolium, 1,3-di-n-butylimidazolium, 3-butyl-1,4,5-trimethylimidazolium, 3-butyl-1,4-dimethylimidazolium, 3-butyl-2-methylimidazolium, 1,3-dibutyl-2-methylimidazolium, 3-butyl-4-methylimidazolium, 3-butyl-2-ethyl-4-methylimidazolium und 3-butyl-2-ethylimidazolium, 1-methyl-3-octylimidazolium, 1-decyl-3-methylimidazolium.

Especial preference is given to 1-butyl-4-methylpyridinium, 1-n-butyl-3-methyl-imidazolium and 1-n-butyl-3-ethylimidazolium.

As anions, all anions are conceivable in principle.
Preferred anions are halides, $F^-$, $Cl^-$, $Br^-$, $I^-$, acetate $CH_3COO^-$, trifluoracetate $CF_3COO^-$, triflate $CF_3SO_3^-$, sulfate $SO_4^{2-}$, hydrogensulfate $HSO_4^-$, methylsulfate $CH_3OSO_3^-$, ethylsulfate $C_2H_5OSO_3^-$, sulfite $SO_3^{2-}$, hydrogensulfite $HSO_3^-$, chloroaluminates $AlCl_4^-$, $Al_2Cl_7^-$, $Al_3Cl_{10}^-$, tetrabromoaluminate $AlBr_4^-$, nitrite $NO_2^-$, nitrate $NO_3^-$, chlorocuprate $CuCl_2^-$, phosphate $PO_4^{3-}$, hydrogenphosphate $HPO_4^{2-}$, dihydrogenphosphate $H_2PO_4^-$, carbonate $CO_3^{2-}$, hydrogencarbonate $HCO_3^-$.

Particular preference is given to acetates, sulfonates, tosylate $p\text{-}CH_3C_6H_4SO_3^-$, sulfates, phosphates, bis(trifluoromethylsulfonyl)imide $(CF_3SO_2)_2N^-$.

Figure 1:
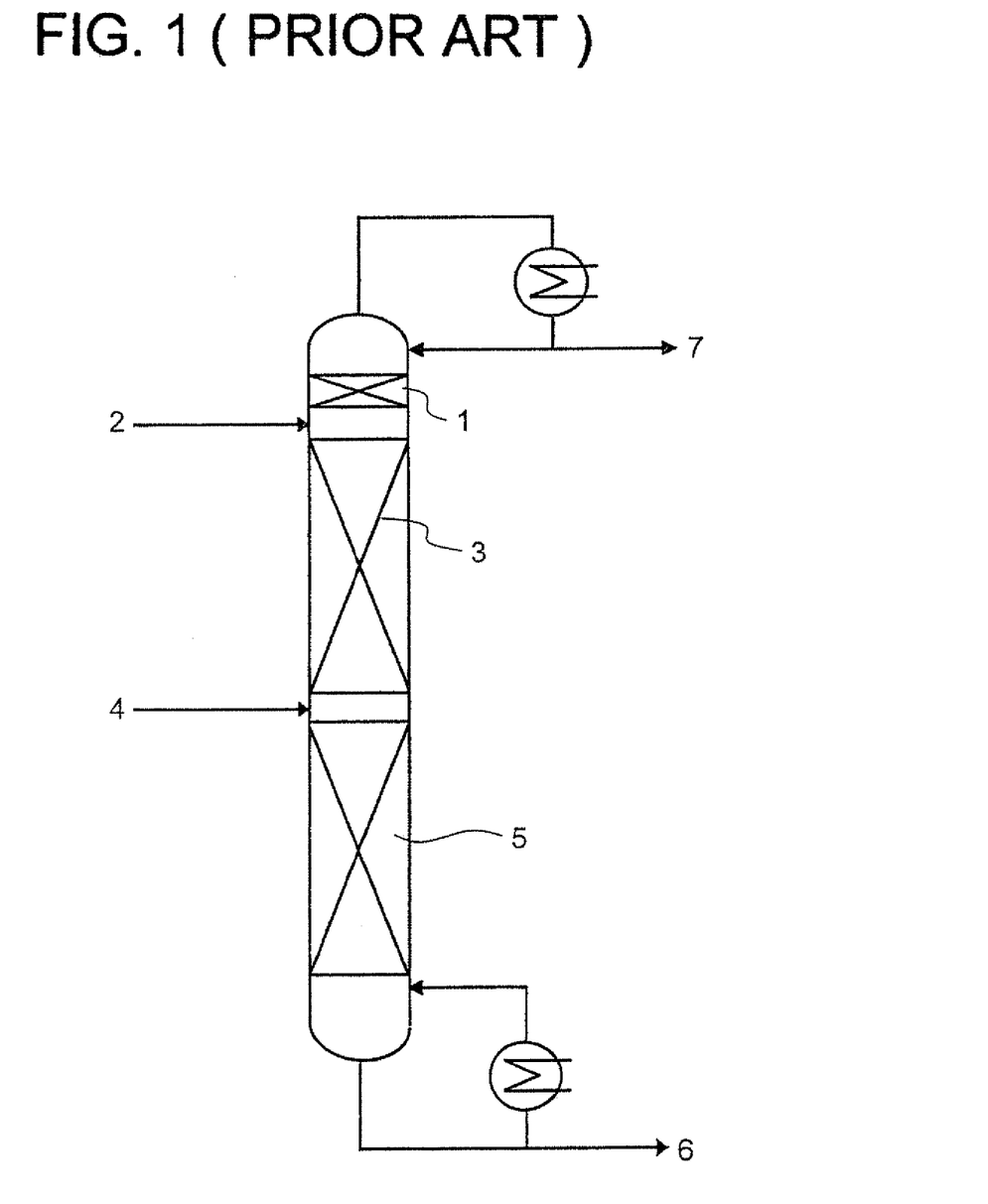
FIG. 1 is a schematic view of an embodiment of extractive rectification as described in WO 02/074718.

An embodiment of extractive rectification is described in WO 02/074718 (cf. FIG. 1). (2) indicates the inflow of the entrainer into a countercurrent rectification column. Since in conventional processes the entrainer has a low but appreciable volatility compared to the overhead product (stream 7), the separation elements (1) have to be used to separate overhead product and entrainer. The separation elements (3) and (5) effect the desired separation of overhead product from bottom product under the action of the entrainer, stream (4) is the feed stream of the components to be separated (feed), stream (6) is the bottom product and the entrainer. Separation elements can be, for example, trays, ordered packing or random packing.

The use of an ionic liquid as entrainer has the advantage that the vapor pressure of the pure ionic liquid and thus also its partial pressure in the mixture with the overhead product are close to zero. Thus, the separation elements (1) can be dispensed with. This is not the case only when volatile impurities are present in the ionic liquid, e.g. components which have not been able to be separated off completely during recycling, or when mixtures of ionic liquids with conventional solvents are used as entrainers. To separate these from the overhead product, it may be necessary to install an enrichment section between the feed point for the ionic liquid and the top of the columns.

The known advantages of ionic liquids compared to conventional entrainers in extractive rectification are essentially:
  Ionic liquids are more selective than conventional entrainers. Due to their comparatively high selectivity, they make it possible for a smaller mass flow, compared to conventional extractive rectification, of entrainer to be fed to the extractive rectification and/or the number of theoretical plates in the extractive rectification column to be reduced.
  As a result of the extremely low vapor pressure of the entrainer, various separation operations which offer operating and capital cost advantages over the second rectification column in conventional extractive rectification can be used for separating the entrainer from the bottom product.

The separation elements "1" lead to separation of the entrainer from the overhead product in conventional extractive rectification, but the separation is never complete. Discharge of proportions of ionic liquid via the vapor phase without the separation elements "1" is not possible because of the extremely low volatility of the ionic liquid.

Capital costs are reduced by elimination of the separation elements.

Suitable ionic liquids are ones which in a total concentration in the liquid of from 5 to 90 mol %, preferably from 10 to 70 mol %, lead to a separation factor between the target components which is different from one.

The use of ionic liquids as entrainers in extractive rectification is particularly useful, inter alia, for the following applications: for example azeotropes: amines/water, THF/water, formic acid/water, alcohols/water, acetone/methanol, acetates/water, acrylates/water, trimethyl borate/methanol, or close-boiling mixtures: acetic acid/water, C4-hydrocarbons, C3-hydrocarbons, alkanes/alkenes, general separation of polar and nonpolar materials which form azeotropes or are close-boiling.

However, the recovery of the ionic liquid after the extractive distillation has hitherto not been solved satisfactorily. Conventional entrainers are usually separated off from the bottom product in a second distillation column. Since ionic liquids cannot be vaporized, accumulation in a countercurrent distillation process is not advantageous and leads to unnecessary capital costs.

WO 02/07418 gives general information as to how the entrainer present can be recovered (page 16). Apart from vaporization, the use of a stripping column (stripper) or precipitation into a solid phase are also mentioned.

The German patent application number 10313207.4 describes adsorptive separation processes by means of which high boilers which are no longer vaporizable are said to be able to be separated off from an ionic liquid. Such a situation occurs when the vaporizable components have already been separated off from the ionic liquid. The mixtures in question are usually mixtures having a very high proportion of ionic liquid and a low level of impurities which would nevertheless accumulate if they were not separated off. Purge streams from IL-containing recycle streams are, for example, a main application here.

It is generally desirable to separate the valuable ionic liquid from the high boiler after the extractive rectification and recover it in high purity. However, a problem found here is that when a vaporizable high boiler is to be separated off by vaporization, relatively high temperatures are necessary to achieve satisfactory separation of high boiler and ionic liquid. The lower the high boiler content of the IL, the higher the temperature. At high boiler contents of about 1% by weight, this temperature can be as high as 200° C. The precise temperature depends on the vapor pressure of the high boiler in the IL. At even lower contents, it can, according to calculations, easily go as high as 1000° C. and more. In the present context, vaporizable high boilers are all vaporizable products which are not taken off as desired low boilers at the top of the extractive distillation column. In the system tetrahydrofuran (THF)/water, for example, the THF would be the low boiler and the water would be the high boiler.

The high liquid-phase temperature leads not only to an increase in the energy costs but also to an increase in the process engineering outlay. Furthermore, there is the problem that above a particular temperature (usually significantly above 200° C.), decomposition of the ionic liquid is observed, which has an adverse effect on the process. It is an object of the present invention to find an improved process for isolating the ionic liquid, which remedies the disadvantages mentioned and makes a technically simple and economical separation possible.

We have found that this object is achieved by a process for working up a bottom stream comprising high boilers and ionic liquid from an extractive rectification in which the ionic liquid is used as entrainer, with comparators feeding the bottom stream to an evaporation stage which is operated at a pressure of less than 500 mbar, preferably less than 100 mbar, particularly preferably less than 20 mbar, and in which the major part of the high boilers present is separated off in vapor form from the IL, i.e. its concentration is reduced to less than 5%, preferably less than 1% and particularly preferably less than 100 ppm. The necessary purity of the IL always depends on the purity which is specifically required in the distillate stream from the extractive rectification in each case, since as soon as impurities are present in the recirculated IL, they partly vaporize on entering the top of the column and contaminate the distillate. If a purity in the distillate of 95% is sufficient, as in, for example, particular cases in the separation of formic acid/water, up to about 5% of water can also be present in the recirculated IL. On the other hand, if a 40 ppm purity is required in the distillate stream, the recirculated IL should also not be contaminated with high boilers to more than this order of magnitude (40-100 ppm).

All concentrations quoted are, unless indicated otherwise, by mass, i.e. % means percent by weight and ppm means ppm by weight.

The present patent application further provides an alternative process for working up a bottom stream comprising high boilers and ionic liquid from an extractive rectification in which the ionic liquid is used as entrainer, which comprises feeding the bottom stream to a stripper supplied with inert gas. Depending on the specific process engineering application, it is particularly advantageous to operate the stripper at ambient pressure, since in this case the inert gases do not have to be compressed. In other applications, operation of the stripper at subatmospheric pressure, preferably at a pressure of less than 900 mbar, particularly preferably less than 500 mbar, is found to be particularly advantageous, since in this case the high boiler content of the IL can be reduced to a lower level at a given flow of inert gas, or a smaller flow of inert gas is necessary for a given reduction in concentration.

The pressure reduction according to the present invention in the evaporation leads to a gentle and effective separation of the vaporizable high boilers from the ionic liquid. For this purpose, the bottom product comprising ionic liquid with contamination by high boilers is fed to a further evaporator. This is operated at a reduced pressure, as a result of which evaporation of the high boiler occurs at relatively low temperatures.

In a preferred embodiment, the extractive rectification is operated at about ambient pressure. However, depending on the specific application, operation under superatmospheric or subatmospheric pressure can also be particularly advantageous. This depends on the vapor pressure of the components to be separated and thus on the condenser temperature established. If the components to be separated all boil at very low temperatures, a person skilled in the art will increase the pressure in the column so that the condenser temperature does not drop below 50° C. Otherwise, cooling water can no longer be used for cooling and the costs increase since refrigerated water or even brine are more expensive than ordinary cooling water.

The pressure in the evaporator is less than about 500 mbar, preferably less than 100 mbar, particularly preferably less than 20 mbar. In a preferred embodiment, the proportion of high boiler in the ionic liquid can be reduced significantly at about the same temperature in the evaporator as in the bottom of the column.

The vapors of the high boiler are either drawn off directly by means of a vacuum pump or are firstly condensed and then brought to ambient pressure by means of a liquid pump or a barometric downpipe. A barometric downpipe is a long downpipe in which the liquid stands and builds up pressure as a result of its mass and the head of liquid. A 10 m high water-filled tube would generate a pressure increase of 1 bar. The condensation of the high boiler occurs at vaporizer pressure and pure substance conditions, since only the gaseous high boiler is present in the condenser. This gives relatively low temperatures which are usually below 0° C. The respective temperature depends on the vapor pressure of the high boiler, e.g. the boiling point of water at 10 mbar is 6.9° C. Depending on the specific separation task, a refrigeration machine may be necessary for cooling the condenser. The advantage of the variant using a condenser and a downstream liquid pump is that very little high boiler is lost. When using a vacuum pump without condenser, the high boiler is lost via the gas phase. When a vacuum pump and condenser are used at ambient pressure, no high boiler is lost. An advantage of this variant is that the condenser can usually be cooled by means of cheap cooling water. It is particularly advantageous to use a liquid ring pump as vacuum pump. This makes partial condensation during compression possible, so that the amount of high boiler vapor to be compressed and the thermodynamic work necessary are reduced. In a preferred embodiment, the liquid ring pump can be operated using ionic liquid as ring medium, which has the advantage that the ionic liquid has a negligible vapor pressure.

Particularly useful types of evaporator are falling film evaporators or thin film evaporators, since they have a short residence time and a small temperature difference and the thermal stress on the products is therefore reduced. The falling film evaporator has a simpler construction and is less susceptible to malfunction, since it contains no rotating parts. The capital costs and operating costs of a falling film evaporator are therefore lower. For this reason, a falling film evaporator should be used if possible.

Due to the evaporator operated at subatmospheric pressure, extremely low concentrations of high boilers in the exiting ionic liquid can be achieved. This ionic liquid can advantageously be recirculated to the extractive rectification, and very high purities of low boilers in the distillate from the extractive rectification can be achieved thereby.

Figure 3:
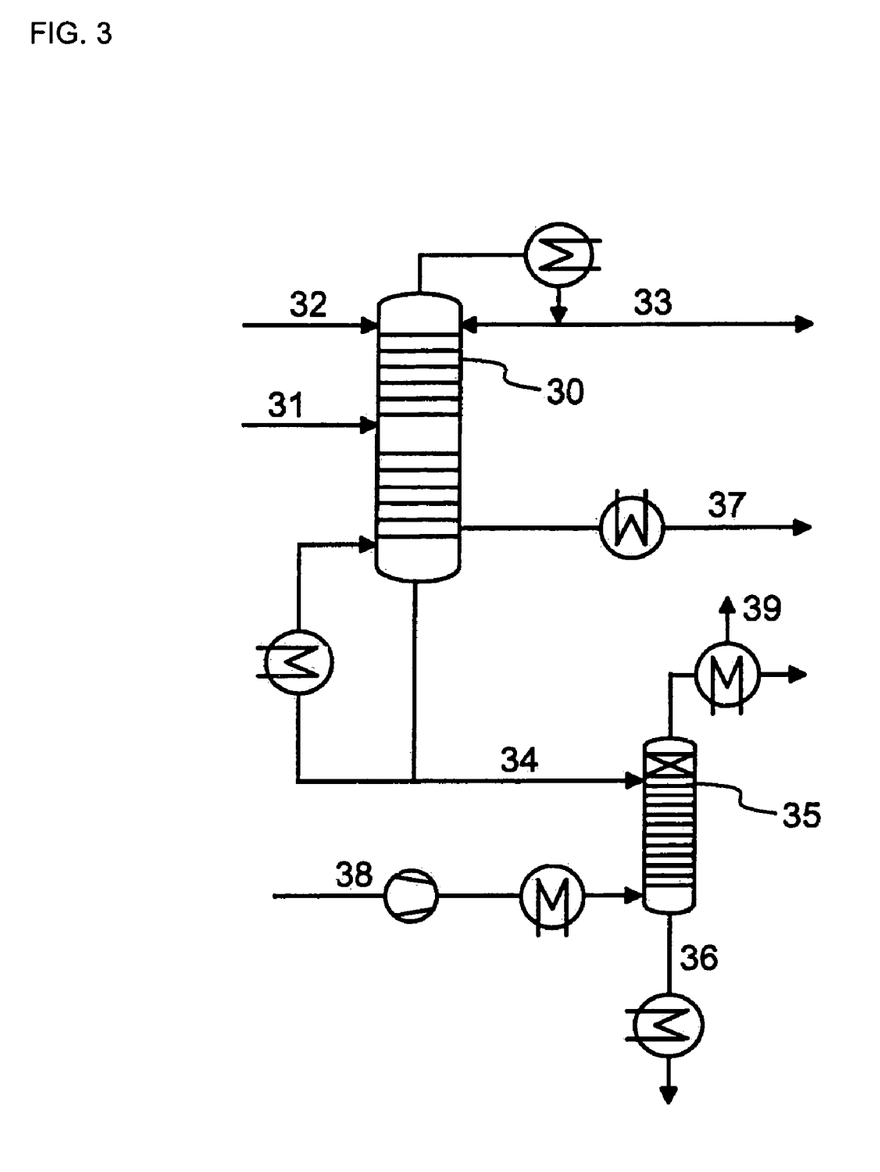
FIG. 3 is a further embodiment of this invention showing a combination of side offtake and stripping column.

In an alternative process, the bottom product comprising ionic liquid contaminated with high boiler can be fed to a stripper operated using gas or vapor. The pressure in the stripper is, as indicated above, preferably approximately ambient pressure, but, depending on the specific application, operation of the stripper at a pressure of less than 900 mbar, particularly preferably less than 500 mbar, can also be particularly advantageous. The stripper is preferably operated in countercurrent (FIG. 3). Here, the ionic liquid laden with high boiler is introduced at the top of the stripper and the gas is introduced at the bottom. In the stripper, the gas phase becomes enriched with the high boiler from the bottom upward and, depending on the height of the stripper and the gas stream used, extremely low concentrations of high boiler can be achieved in the ionic liquid leaving the bottom of the stripper. This ionic liquid can advantageously be recirculated to the extractive rectification, and very high purities of high boilers can be achieved thereby.

Stripping is preferably carried out using a gas which is cheap, readily available, nontoxic and inert. Particular preference is given to using air as inert gas. In this case, it has to be noted that the air may have to be freed of atmospheric moisture (water), i.e. be dried. In summer, the atmospheric moisture content can be up to 1%. Since this air is brought into countercurrent contact with the ionic liquid leaving the bottom of the stripper, the water concentration in the ionic liquid can not go below a particular value in the case of a high atmospheric moisture content. If the water concentration is too high, too much water is introduced into the extractive rectification. There it either contaminates the overhead product or leads to other undesirable effects. Drying of the air can be achieved, for example, by means of adsorption methods which are known from the literature (molecular sieves, etc.).

In an advantageous variant, superheated vapors, preferably of components which are already present in the system, e.g. low boilers already present, can be used as stripping medium. Use of the low boiler results in the advantage that traces of low boiler are acceptable in the ionic liquid, since when the ionic liquid is recirculated to the top, the low boiler does not represent a contaminant which interferes there. Furthermore, the stripper vapors can then be condensed completely using cooling water, since no inert gas is present. The losses of high boiler are then minimal.

The overhead product from the stripper comprises gas enriched in the high boiler. This can, when it is not a product of value, be incinerated, or, when it is nontoxic, can be released into the surrounding air. If the loss is undesirable, it can be largely separated out by means of a dephlegmator. For the purposes of the present invention, a dephlegmator is a partial condenser (the inert gases are not condensable at these temperatures). Here too, depending on the specific application, low temperatures and thus a refrigeration machine are once again necessary to achieve quantitative condensation of the high boiler. It has to be noted that in the stripper version, the entire gas stream, i.e. inert gas or vapor and high boiler, has to be cooled. The cooling power required is lower in the evaporator version in which only the high boiler is cooled. When making the decision as to whether a dephlegmator is necessary, higher capital costs have to be weighed up against the losses of high boiler. This can be done by means of a cost calculation. Whether one or other variant is more economical is determined essentially by the materials in the system and by the size of the plant.

A further advantageous variant of the process has a combination of external evaporator and stripper. The bottom product comprising ionic liquid contaminated with high boilers is in this case firstly introduced into an evaporator operated according to the present invention at superatmospheric pressure and then introduced into a stripper. Here too, whether the stripper is operated at ambient pressure or under reduced pressure depends on the particular separation task. Since the number of apparatuses increases, the capital costs increase but, on the other hand, the energy costs are reduced. In processes in which the energy costs outweigh the capital costs, this is the preferred embodiment.

In all the versions described above, the evaporator can, particularly when used in combination with the stripper, advantageously be operated as a simple flash vessel, i.e. without additional supply of heat. The high boiler then vaporizes purely as a result of the pressure reduction. The enthalpy of vaporization is in this case derived from the internal energy of the liquid, i.e. the temperature of the liquid entering the vaporizer will be reduced. Since the amount of high boiler is relatively small compared to the amount of ionic liquid, the temperature reduction is also small. An advantage of this variant is that the heat exchanger in the evaporator can be dispensed with.

In the stripping section of the extractive rectification, the low boiler (LB) is separated off from high boiler (HB) and ionic liquid (IL), so that no low boiler is present in the bottoms. This can be achieved by a person skilled in the art of distillation by means of a sufficient number of theoretical plates in the stripping section when the IL gives a selectivity of greater than 1.3, which is its nominated task. Since the IL has no vapor pressure, the vapor phase at the bottom consists entirely of high boiler. Part of this can be taken off as a gaseous sidestream. This side offtake and the equipment necessary are designed according to the usual rules. It has to be noted that liquid droplets have to be separated off by means of a suitable precipitator, since otherwise IL will be carried out with the vapor. Since the separation factor between IL and HB is infinite, one vaporization stage is sufficient for separation. If other high-boiling impurities are present or are formed in the bottoms or a mixture of IL and conventional solvents has been used as entrainer, further separation elements between the bottom and the side offtake are necessary.

The high-boiling product is preferably taken off in the sidestream in the stripping section close to the bottom, particularly preferably from one of the three bottommost plates, very particularly preferably directly from the bottommost plate.

The optimum amount of the sidestream depends on the permissible temperature at the bottom of the extractive rectification column. The larger the stream, the more HB is removed from the stripping section of the column and the less HB is present in the IL and thus in the bottoms. As a consequence, the temperature increases at the bottom since the IL has no vapor pressure. Here, the thermal stability of the components in the bottoms and the stressability of the material have to be taken into account. The object is a very low HB content in the IL without thermal damage occurring. Depending on the mixture and the operating pressure, the permissible temperature at the bottom can be from 50° C. to above 200° C. It is preferably in the range from 100 to 200° C. Owing to the thermal stability of customary ionic liquids, a temperature of 250° C., preferably 200° C., should not be exceeded.

The sidestream enables the HB content of the IL-rich bottom stream from the column to be reduced greatly. It is possible to achieve HB contents in the IL of less than 10%, preferably less than 5%, particularly preferably less than 1%, with the achievable values depending on the pressure and permissible temperature in the bottom of the column. The removal of the HB from the IL is aided not only by a high temperature but also a high vapor pressure of the HB and a low column pressure.

If the HB is to be obtained as liquid product, the gaseous sidestream has to be liquefied by means of an additional condenser.

Figure 2:
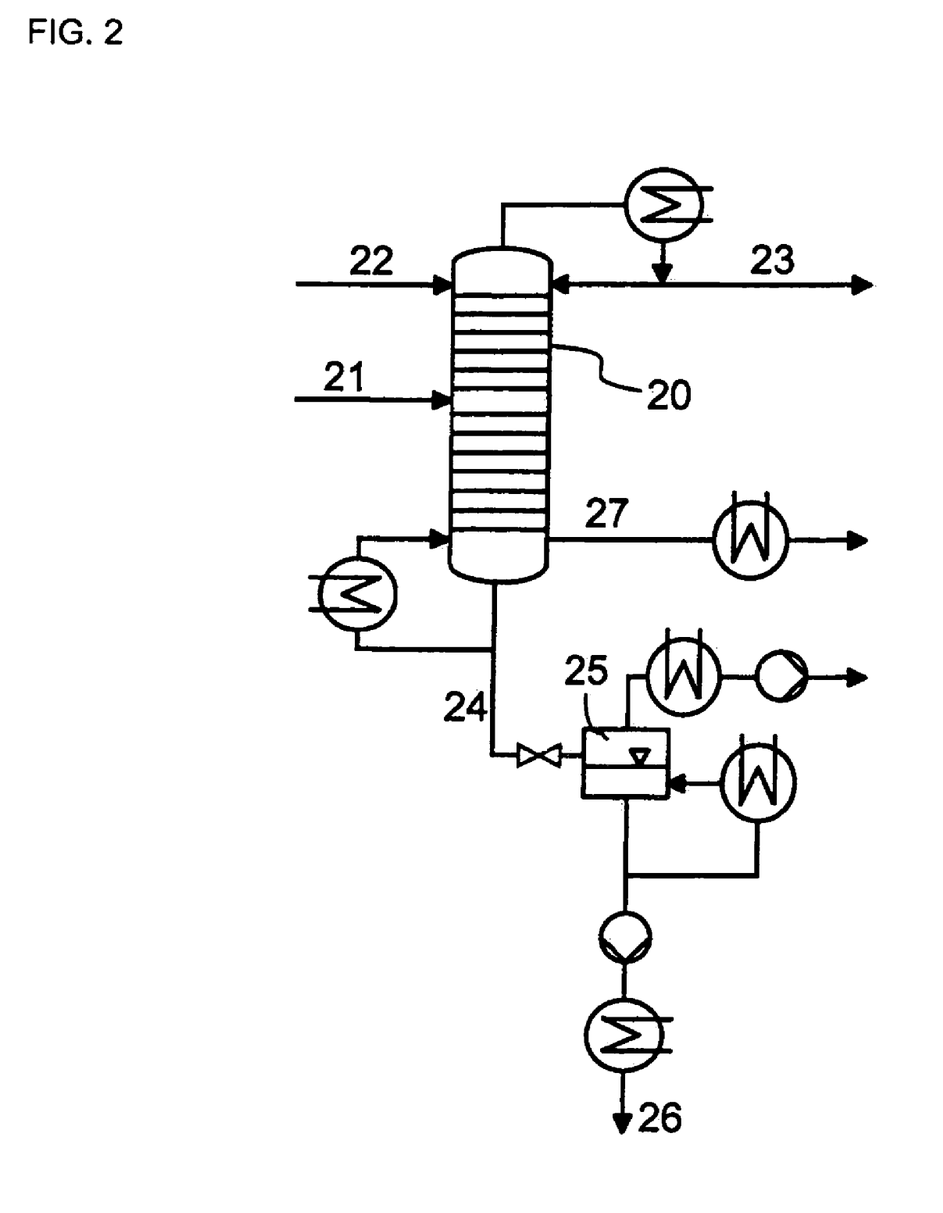
FIG. 2 is a schematic view of an embodiment of this invention which shows a combination of side offtake and evaporator.

In a particularly preferred embodiment, the work-up stage of evaporator and/or stripper according to the present invention is combined with the side offtake. In this way, the effective and gentle recovery of high-purity, ionic liquid can be improved further in a technically simple manner. FIG. 2 shows a combination of side offtake and evaporator. The feed is fed via line (21) into the countercurrent rectification column (20) and the ionic liquid as entrainer is fed in via line (22). The overhead stream is taken off via line (23). The bottom stream is conveyed by means of line (24) to an evaporator (25) in which the ionic liquid is separated off according to the present invention. The ionic liquid obtained in this way can be recirculated via line (26) to the countercurrent rectification column. Via the side offtake (27) which is additionally present in a preferred embodiment, a gaseous high boiler is taken off from the column (20), which further improves the separation.

Figure 2A:
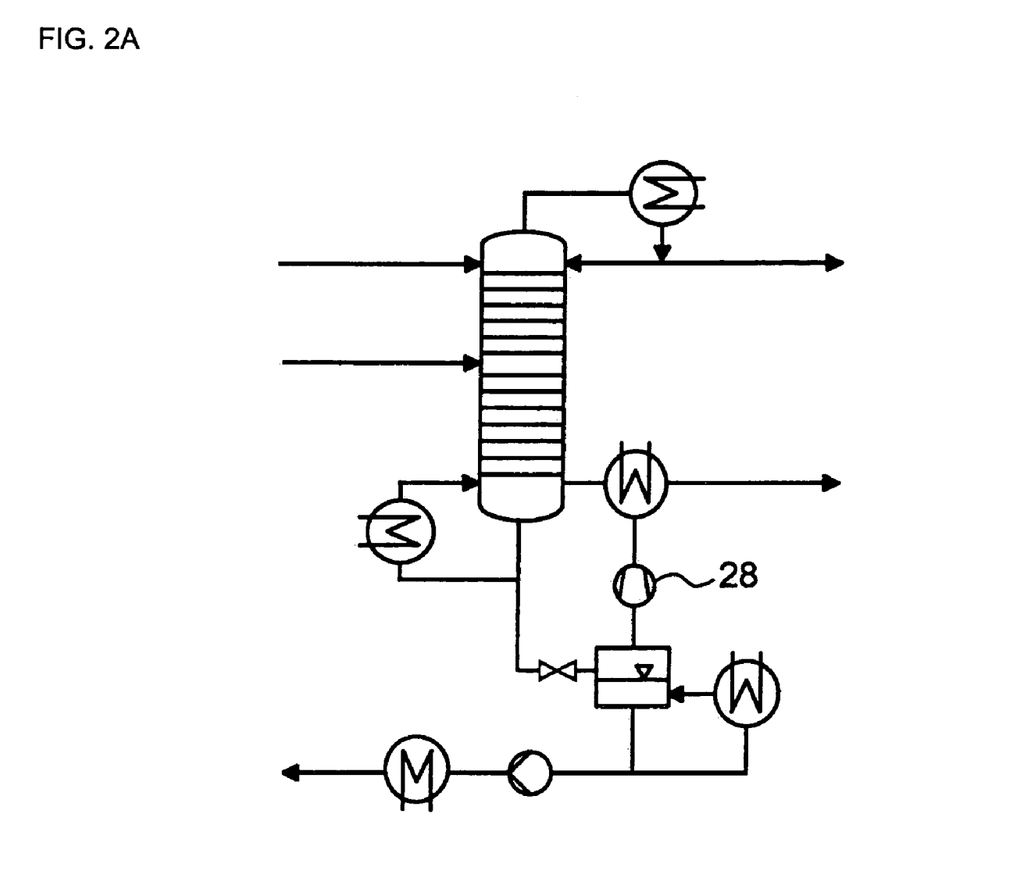
FIG. 2a is a view similar to FIG. 2 which utilizes a compressor.

In FIG. 2a, the condenser with downstream liquid pump on the evaporator in FIG. 2 has been replaced by a compressor (28). The high boiler vapors which have been compressed to ambient pressure are liquefied in a condenser.

Figure 2B:
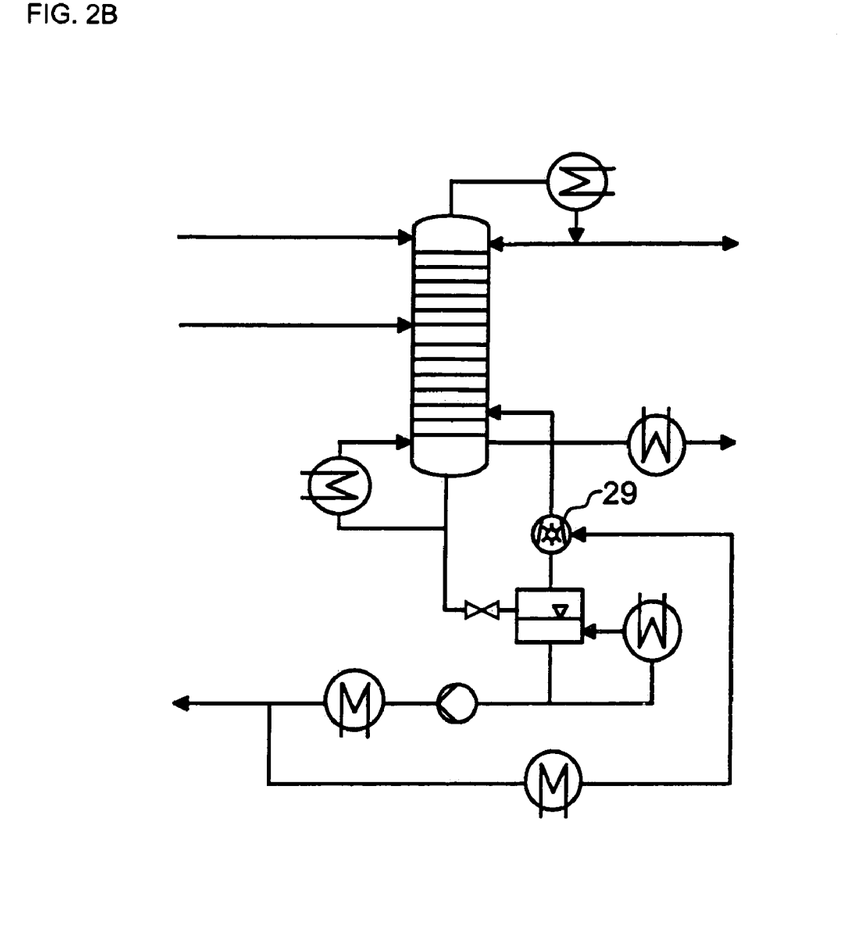
FIG. 2b is a view similar to FIGS. 2 and 2a which utilizes a liquid ring pump.

In FIG. 2b, the setup of FIGS. 2 and 2a has been varied by using a liquid ring pump (29) as compressor. Part of the ionic liquid which leaves the evaporator is cooled and passed as ring liquid to the liquid ring pump. This is operated in the continuous flow mode. The mixture of IL and HB obtained at ambient pressure is recirculated to the stripping section.

A combination of side offtake and stripping column can be seen in FIG. 3. The feed is fed via line (31) to the countercurrent rectification column (30) and the ionic liquid is fed in as entrainer via line (32). The overhead stream is taken off via line (33). The bottom stream is conveyed by means of line (34) to a stripper (35) in which the ionic liquid is separated off according to the present invention. For this purpose, inert gas is fed via line (38) to the stripper and the gas mixture comprising inert gas and high boiler is discharged via line (39). In a preferred embodiment, high boiler present is partially separated out in a dephlegmator. The ionic liquid obtained in this way can be recirculated via line (36) to the countercurrent rectification column. Depending on the specific application, a heat exchanger may be necessary to cool the IL to a suitable temperature before it is returned to the extractive rectification column. Via the side offtake (37) which is additionally present in a further preferred embodiment, a gaseous high boiler is taken off from the column (30), which further improves the separation.

Properties and descriptions which have been mentioned above in respect of the evaporator also apply to the preferred combination of evaporator and side offtake in the extracted rectification column. Furthermore:

in the combination of side offtake and evaporator, a large part of the high boiler is separated off in the bottom region of the extractive rectification via the side offtake and the stream to be separated off in the evaporator installed downstream of the column is therefore significantly smaller. The amount of ionic liquid which flows through the evaporator remains the same. Only the high boiler content is reduced. The high boiler which vaporizes in the evaporator operated at subatmospheric pressure can either be condensed directly and brought to ambient pressure by means of a liquid ring pump or be drawn off by means of a vacuum pump. Since a smaller amount of high boiler has to be separated off in the evaporator as a result of the side offtake, the separation task in the evaporator becomes easier, it can be made smaller and less energy is consumed in the evaporation and any subsequent condensation.

The side stream comprising the high boiler is usually also condensed. The condenser there operates at a pressure higher than that in the condenser of the downstream evaporator. Thus, the energy of condensation from the side stream is therefore obtained at a higher temperature and inexpensive cooling water can be utilized for heat removal here. If the temperature is high enough, the energy of condensation can even be utilized for generating steam. At the same time, the energy of condensation in the condenser of the vaporizer, which has to be removed by means of considerably more expensive refrigeration energy, is decreased. This is one of the substantial advantages of the combination of side offtake and evaporator.

A disadvantage of the use of a side offtake is that all the energy which is consumed by the extractive rectification has to be supplied at the bottom of the column at a higher temperature level. In addition, the energy to be supplied at the bottom increases because the high boiler has to be taken off in vapor form at the side offtake. This requires a larger bottom vaporizer.

This leads to an increase in the capital and operating costs for the extractive rectification. This is balanced by the significant reduction in the costs for the downstream vaporizer. Both effects have to be taken into account and weighed up against one another. The optimum depends on the substances present in the system and the capacity of the plant. Since refrigeration energy is generally more expensive than steam, the advantages achieved by use of a side offtake frequently predominate.

The properties and descriptions which have been mentioned above in respect of the variant with a stripper also apply to the combination of stripper and side offtake in the extractive rectification. Furthermore:

the major part of the high boiler is taken off from the column in vapor form via the side offtake. If required, this side stream can be liquefied in an additional condenser. Since the HB content in the IL leaving the bottom of the column is then lower, the separation task to be performed in the subsequent stripper is easier. The gas or vapor flow required there becomes lower and the stripping column becomes narrower. Since the concentration of HB in the IL at the inlet decreases, the necessary height of the stripper also decreases. However, the reduction in the height is comparatively small, since it is not so much the inlet concentration but the required purity of the IL leaving the column which determines the height of the column.

In the version with side offtake and stripper and dephlegmator, the cooling power and the size of the dephlegmator are also reduced considerably in addition to the changes in the stripper as a result of the side offtake. Since in this case only part of the high boiler leaves the stripper via the top, it can in some cases be economically advantageous to dispose of this part of the high boiler together with the inert gas, i.e. not to condense it. The refrigeration machine necessary for the condensation, including the energy necessary for compressor and cooling, can then be saved. Whether the reduction in the capital and operating costs achieved by dispensing with the dephlegmator and refrigeration machine outweigh the costs of the loss of high boiler can be decided on the basis of a cost calculation and depends on the particular substances present in the system. The same applies to the side offtake. Whether it is economical in the case of the stripper variant has to be evaluated by means of a cost calculation for the particular case.

In an advantageous variant, superheated steam is used as "inert gas" for purifying the IL in the stripper. In the case of a side offtake, the quantity of steam required is relatively small, as already indicated above. In this variant, all of the stream from the top of the stripper can be condensed, since it contains no actual inert gas. The liquid stream produced in this way comprises a mixture of LB and HB which is fed into the extractive rectification at a suitable point and is thus worked up again. The high boiler is discharged only via the side offtake. An advantage of this variant is that no refrigeration machine is required for the condensation. Cooling can be carried out using cheap cooling water. In addition, no high boiler is lost.

The version with stripper and side offtake is particularly advantageous in the case of systems in which the high boiler is water. The stream from the top of the stripper can then simply be discharged into the surrounding air because it contains only water and inert. Since water is already present in the system, the inert gas may not have to be dried. Whether drying is necessary has to be decided on the basis of the maximum permissible concentration of water in the IL recirculated from the bottom of the stripper. This is, as indicated above, determined by the water concentration in the inflowing inert gas stream and is reflected in the water contamination in the distillate from the column.

The process of the present invention offers a technically simple and economical way of working up the bottom stream from the extractive rectification. Ionic liquid can be obtained in high purity with a small outlay in terms of apparatus. The temperatures required for the separation are relatively low, which not only reduces the energy consumption but also avoids undesirable decomposition of the ionic liquid. The ionic liquid obtained in this way can be recirculated to the column and be reused as entrainer there.

Version with only side offtake and no additional work-up of the bottom stream:
if the IL laden with residual HB is introduced directly at the top of the extractive rectification (circulation of the IL), part of the HB will get into the vapor phase at the top and contaminate the overhead product (LB). If the purity requirements for the LB are moderate, the depletion of the HB in the IL with a side offtake alone can be sufficient, and no further work-up of the IL is necessary.

In this particularly advantageous variant, an azeotropic or close-boiling mixture would be separated into low boiler and high boiler by addition of an IL in a column with side offtake without further additional equipment items. Compared to a normal extractive rectification, which always requires a second column for working up the entrainer, this results in considerable capital cost savings.

All work-up variants have up to now been described for ionic liquids. They apply analogously to all entrainers in extractive distillations which have a particularly low vapor pressure, e.g. hyperbranched polymers [Seiler, M.; "Dendritic Polymers—interdisciplinary research and emerging applications from unique structural properties", Chem. Eng. Technol., 25, 3, 237 (2002)], dendrimers [Inoue, K. "Functional dendrimers, hyperbranched and star polymers" Prog. Polym. Sci., 25, 453 (2000)] or similar substances.

EXAMPLES

In the following examples, all concentrations are, unless indicated otherwise, by mass, i.e. % is % by weight and ppm is ppm by weight.

In all examples, the feed to the extractive rectification column was 844 kg/h of a binary mixture consisting of 77% of TMB (trimethyl borate) and 23% of methanol. The column always had 20 theoretical plates and was operated at a reflux ratio of RR=0.5 and a pressure of P=1 bar. The feed plate was always at theoretical plate 12. The experiments were carried out so that 650 kg/h of TMB having a residual methanol content of 500 ppm were obtained as overhead product.

Extractive Rectification with Evaporator at 1 Bar

Example 1

(cf. FIG. 2 without Side Offtake and without Throttle Valve Between Column and evaporator)

1 441 kg/h of the IL (1-ethyl-3-methylimidazolium tosylate) were introduced at the top of the column. The IL contained 103 ppm of methanol. Top and bottom temperatures established were 67 and 95.4° C., respectively. A stream of 1 635 kg/h comprising 88% of IL and 12% of methanol was obtained as bottom product. The bottom product was fed into the downstream evaporator. This was operated at 1 bar and 180° C. The vapors obtained there were condensed in a condenser at 1 bar and 64.6° C. 179 kg/h of pure methanol were obtained as evaporator vapor. The stream leaving the bottom had a flow rate of 1 456 kg/h and comprised 99% of IL and 1% of methanol. The heat exchangers had the following power requirements: column condenser: 90 kW, column vaporizer: 134 kW, downstream vaporizer: 182 kW, condenser of the evaporator stage: 64 kW.

Result: The stream from the bottom of the evaporator should actually be recirculated to the extractive rectification as purified IL. In this variant, it still contains 1% of methanol. If this stream were actually reused as entrainer in the extractive rectification, the overhead product purity of 500 ppm of methanol would not be achievable. In this version, the output from the bottom of the evaporator has to be discarded and fresh IL has to be continually supplied to the extractive rectification. Such a process is not economically viable.

Extractive Rectification with Evaporator at 10 mbar

Example 2

(cf. FIG. 2 without Side Offtake)

Here, only the details differing from example 1 are described:

The evaporator installed downstream of the extractive rectification was operated at 10 mbar and 180° C. The vapors from the evaporator were condensed completely in the condenser at −19.5° C. A pure methanol stream of 194 kg/h was obtained here. In the downstream evaporator and condenser, the quantity of energy transferred was 185 kW and 81 kW, respectively.

Result: In this advantageous version, a residual methanol content of 100 ppm in the ionic liquid to be recirculated is achieved at the same downstream evaporator temperature. This IL can be reused as entrainer to achieve the required distillate purity. The extractive rectification was operated in the same way as in example 1.

Extractive Rectification with Stripper

Example 3

(cf. FIG. 3 without Side Offtake)

Only the details different from example 1 are described here:

As entrainer, 1 523 kg/h of IL contaminated with 1 ppm of methanol were introduced. The bottom product obtained in the extractive rectification was a stream of 1 717 kg/h comprising 89% of IL and 11% of methanol. It was fed to the top of the stripper which had a total of 9 theoretical plates and was operated at 1 bar. At the bottom of the stripper, 2 305 kg/h of dried air which had been preheated to 180° C. were introduced. The stream from the top of the stripper was conveyed to a dephlegmator which condensed a large part of the gaseous methanol at −5.4° C. 122 kg/h of liquid methanol were obtained in the dephlegmator. The remainder of the methanol was carried out with the air stream which had a residual methanol content of 3%. The output from the bottom of the stripper was 1 523 kg/h of IL having a residual methanol content of 1 ppm. The amounts of energy required in the heat exchangers were: column vaporizer: 138 kW, preheating of the stripping air: 100 kW, dephlegmator of the stripper: 88 kW.

Result: As a result of the downstream stripper, the residual methanol content in the ionic liquid to be recirculated can be reduced to 1 ppm. This value is significantly lower than in example 2 (version with evaporator at 10 mbar). To achieve this value in the evaporator version, significantly higher temperatures or lower pressures would have to be set there. For separation tasks in which particularly high purities of the overhead product from the extractive distillation are required, the stripper variant is superior to the evaporator variant.

Extractive Rectification with Evaporator and Stripper

Example 4

Only the details differing from example 1 are described here: the evaporator was operated at 0.28 bar and 140° C. 182 kg/h of pure gaseous methanol left the evaporator. The bottom stream comprised 1 452 kg/h of IL containing 0.8% of methanol. This was fed to the top of the stripper. 102 kg/h of dried air which had not been preheated was passed through the stripper in countercurrent. The stream from the top of the stripper was 113 kg/h of air containing 10% of methanol. At the bottom of the stripper, 1 441 kg/h of IL having a residual methanol content of 1 ppm were taken off. The amounts of energy required in the heat exchangers were: downstream evaporator: 117 kW, condenser of the evaporator: 66 kW, preheating of the stripping air: 0 kW.

Result: The combination of flash evaporator and stripper made it possible to produce high-purity ionic liquid which can be recirculated. The maximum temperature in the overall plant was only 140° C. The energy required is reduced as a result. At an energy input of 251 kW (bottom of the column plus downstream evaporator), this particularly advantageous variant is very favorable in energy terms.

Extractive Rectification with Side Offtake and Evaporator at 10 mbar

Example 5

(cf. FIG. 2)

Only the details differing from example 1 or 2 are described here:

The amount of entrainer fed in was 1 384 kg/h of IL having a residual methanol content of 103 ppm. In the bottom region, 179 kg/h of pure methanol were taken off in vapor form as a side stream and then condensed at 64.6° C. The temperature at the bottom increased to 180° C. The bottom product from the column had a flow rate of 1 399 kg/h and comprised 99% of IL and 1% of methanol. The evaporator was operated at 10 mbar and 180° C. and the condenser was operated at −19.5° C. The amount of vapor from the evaporator had a flow rate of 15 kg/h and consisted of 100% methanol. The bottoms from the evaporator (IL for recirculation) consisted of 1 384 kg/h of IL having a residual methanol content of 103 ppm. The quantities of energy for the heat exchangers were: column vaporizer: 301 kW, side stream condenser: 60 kW, downstream evaporator: 4 kW, condenser: 6 kW.

Result: As in example 2, the necessary purity is achieved in the output from the bottom of the downstream evaporator and the IL can be recirculated. In this particularly advantageous version, the quantity of heat to be removed at −19.5° C. in the condenser of the downstream evaporator is significantly lower as a result of the side stream. This is advantageous, since refrigeration energy is significantly more expensive than steam. In addition, the amount of IL which has to be circulated decreases and the methanol loss is small.

Extractive Rectification with Side Offtake and
Evaporator at 10 mbar and Liquid Ring Pump Example 6

(cf. FIG. 2b)

Only the details differing from example 5 are described here:

The liquid ring pump was used to set the 10 mbar in the downstream evaporator and to compress the methanol drawn off to ambient pressure. The pump was operated using IL as pump liquid. For this purpose, 100 kg/h of the IL leaving the bottom of the downstream evaporator were branched off and cooled to 28° C. This IL was fed to the liquid ring pump. During compression in the pump, a large part of the methanol dissolved in the IL. The stream leaving the pump at ambient pressure had a flow rate of 102.6 kg/h and comprised 97.5% of IL and 2.5% of methanol. It was recirculated to the bottom of the extractive rectification. The gaseous side stream from the bottom region of the column rose to 193.8 kg/h of pure methanol as a result of this circulation. 1 381 kg/h of IL containing 103 ppm of methanol were fed to the extractive rectification column. The output from the bottom of the column was 1 496 kg/h of IL containing 1% of methanol. During compression in the liquid ring pump, the IL/methanol mixture warmed up only slightly. The power required for the heat exchangers was: column vaporizer: 319 kW, side stream condenser: 65 kW, evaporator: 4 kW, additional cooling for the IL to the liquid ring pump: 3 kW.

Result: In this particularly advantageous variant, the refrigeration machine is replaced by a liquid ring pump. The temperature of 28° C. which can be achieved by means of inexpensive cooling water is sufficient to condense a large part of the methanol. Since the amount of gas decreases, the energy required for compression also drops. All of the methanol can be taken off in vapor form via the side offtake. The IL stream required for the liquid ring pump is only about 7% of the total IL being circulated. The plant is simplified thereby and the capital and operating costs decrease.

Extractive Rectification with Side Offtake, Stripper and Dephlegmator

Example 7

(cf. FIG. 3)

Only the details differing from example 1 or 3 are described here:

1 364 kg/h of IL were fed into the column as entrainer. 179 kg/h of pure methanol was taken off in gaseous form at the side offtake in the bottom region of the column and then condensed. The temperature at the bottom was 180° C. The bottom product obtained had a flow rate of 1 378 kg/h and consisted of a mixture of 99% of IL and 1% of methanol. This was fed to the top of the stripper. The air flow was 34 kg/h. It was dried but not preheated. The vapors from the stripper were passed to a dephlegmator. 35 kg/h of methanol were condensed out there at −5.4° C. The bottom product from the stripper consisted of 1 364 kg/h of IL having a residual methanol content of 1 ppm. The quantities of energy for the heat exchangers were: column vaporizer: 299 kW, side stream condenser: 60 kW, dephlegmator: 7 kW.

Result: In this particularly advantageous version, significantly less air is used compared to example 3. The refrigeration requirement for the dephlegmator therefore also decreases. In addition, the air does not have to be preheated.

The IL obtained at the bottom of the stripper once again has a very good purity and can be reused directly in the extractive rectification.

We claim:

1. A process for working up a bottom stream comprising one or more high boilers and ionic liquid salts which are liquid at temperatures below 200° C. from an extractive rectification in which the ionic liquid is used as entrainer, which comprises feeding the bottom stream to an evaporation stage which is operated at a pressure of less than 500 mbar and in which the major part of the high boiler present is separated off in vapor form from the ionic liquid so that the high boiler content of the ionic liquid is reduced to concentrations of less than 5% by weight and subsequently feeding the worked-up ionic liquid to a stripper which is supplied with inert gas or superheated steam and operating at a pressure of less than 900 mbar, wherein high boilers are discharged in vapor form via a side offtake on an extractive rectification column.

2. A process for working up a bottom stream comprising one or more high boilers and ionic liquid salts which are liquid at temperatures below 200° C. from an extractive rectification in which the ionic liquid is used as entrainer, which comprises feeding the bottom stream to a stripper which is supplied with superheated steam comprising a low boiler and is operated at ambient pressure or at a pressure of less than 900 mbar.

3. The process according to claim 2, wherein high boilers are discharged in vapor form via a side offtake on an extractive rectification column.

4. The process according to claim 2, wherein the worked-up ionic liquid is recirculated to an extractive rectification column.

5. A process for working up a bottom stream comprising one or more high boilers and ionic liquid salts which are liquid at temperatures below 200° C. from an extractive rectification in which the ionic liquid is used as entrainer, which comprises feeding the bottom stream to an evaporation stage which is operated at a pressure of less than 500 mbar and in which the major part of the high boiler present is separated off in vapor form from the ionic liquid so that the high boiler content of the ionic liquid is reduced to concentrations of less than 5% by weight and subsequently feeding the worked-up ionic liquid to a stripper which is supplied with inert gas or superheated steam and operating at ambient pressure, and wherein high boilers are discharged in vapor form via a side offtake on an extractive rectification column.

6. The process according to claim 5, wherein the side offtake used for separating off the high boilers is positioned in a stripping section of the extractive column at the bottom.

7. A process according to claim 6 wherein the side offtake is positioned at one of three bottom-most theoretical plates of the extractive column.

8. A process according to claim 6 wherein the side offtake is positioned at a bottom-most theoretical plate of the extractive column.

9. A process for working up a bottom stream comprising one or more high boilers and ionic liquid salts which are liquid at temperatures below 200° C. from an extractive rectification in which the ionic liquid is used as entrainer, which comprises feeding the bottom stream to an evaporation stage which is operated at a pressure of less than 500 mbar and in which the major part of the high boiler present is separated off in vapor form from the ionic liquid so that the high boiler content of the ionic liquid is reduced to concentrations of less than 5% by weight and subsequently feeding the worked-up ionic liquid to a stripper which is supplied with inert gas or superheated steam and operating at ambient pressure, and wherein the worked-up ionic liquid is recirculated to an extractive rectification column.

10. A process for working up a bottom stream comprising one or more high boilers and ionic liquid salts which are liquid at temperatures below 200° C. from an extractive rectification in which the ionic liquid is used as entrainer, which comprises feeding the bottom stream to an evaporation stage which is operated at a pressure of less than 500 mbar and in which the major part of the high boiler present is separated off in vapor form from the ionic liquid so that the high boiler content of the ionic liquid is reduced to concentrations of less than 5% by weight and subsequently feeding the worked-up ionic liquid to a stripper which is supplied with inert gas or superheated steam and operating at ambient pressure, and wherein, when an evaporator is used, a liquid ring pump is used for compressing the vapors to ambient pressure, with the liquid ring pump being operated using ionic liquid as ring liquid.

11. A process for working up a bottom stream comprising one or more high boilers and ionic liquid salts which are liquid at temperatures below 200° C. from an extractive rectification in which the ionic liquid is used as entrainer, which comprises feeding the bottom stream to an evaporation stage which is operated at a pressure of less than 500 mbar and in which the major part of the high boiler present is separated off in vapor form from the ionic liquid so that The high boiler content of The ionic liquid is reduced to concentrations of less than 5% by weight and subsequently feeding the worked-up ionic liquid to a stripper which is supplied with inert gas or superheated steam and operating at a pressure of less than 900 mbar, and wherein the worked-up ionic liquid is recirculated to an extractive rectification column.

* * * * *